United States Patent [19]
Baker

[11] 3,767,117
[45] Oct. 23, 1973

[54] PORTABLE PIPE THAWER

[76] Inventor: Earl W. Baker, Rt. 1, Box 388, West Hurley, N.Y. 12491

[22] Filed: Mar. 16, 1972

[21] Appl. No.: 235,347

[52] U.S. Cl. .............................................. 239/136
[51] Int. Cl. ............................................. B05b 1/24
[58] Field of Search .......................... 239/135, 136; 122/234, 460; 126/351, 344; 138/35; 431/344

[56] References Cited
UNITED STATES PATENTS

| 1,648,988 | 11/1927 | Kemper | 122/234 |
| 246,231 | 8/1881 | Spencer | 138/35 |
| 2,330,034 | 9/1943 | Doodchenko | 239/136 X |
| 1,361,023 | 12/1920 | Darley | 138/35 |

Primary Examiner—M. Henson Wood, Jr.
Assistant Examiner—Andres Kashnikow
Attorney—John Q. McQuillan et al.

[57] ABSTRACT

A portable device for thawing pipe, by delivering a pencil-like jet of steam to the interior frozen portion of the pipe. Water in a boiler is heated, converted into steam and fed through tubing which has been inserted in the pipe.

1 Claim, 3 Drawing Figures

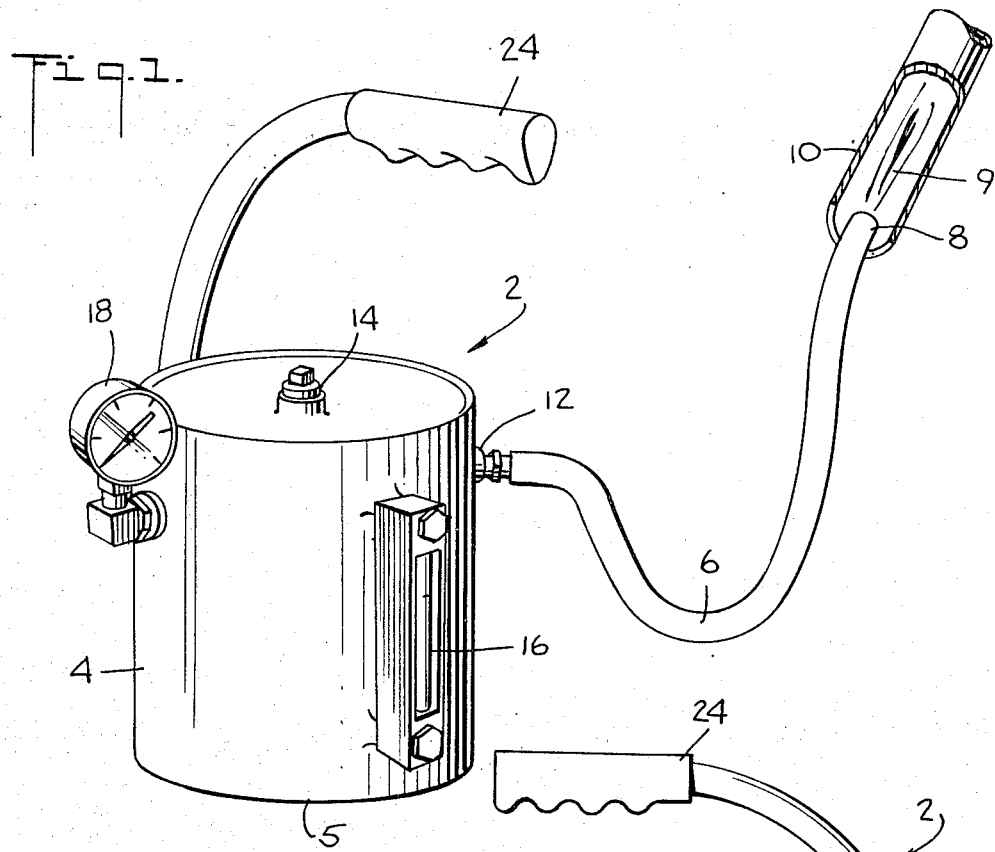
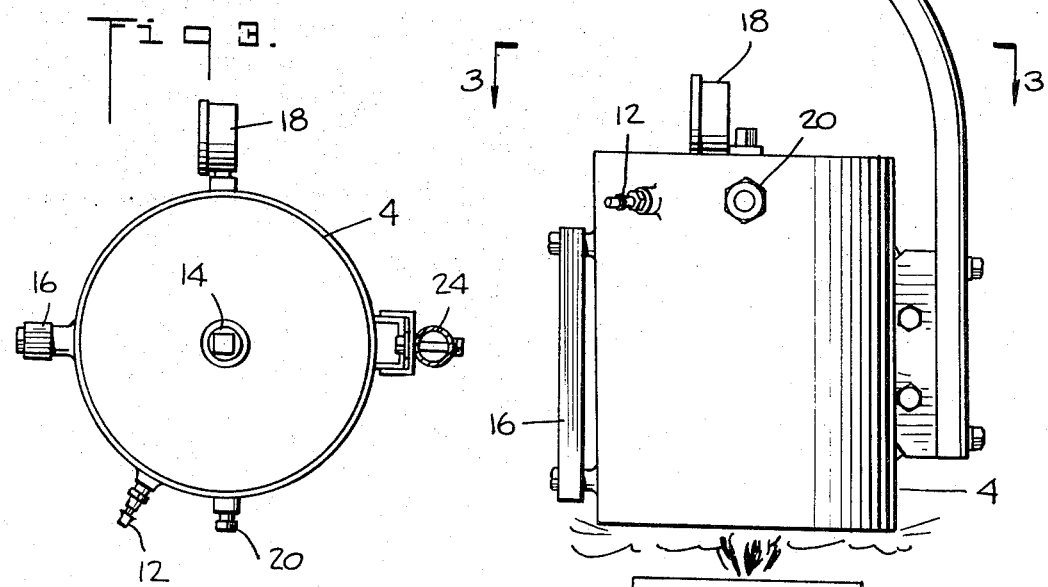
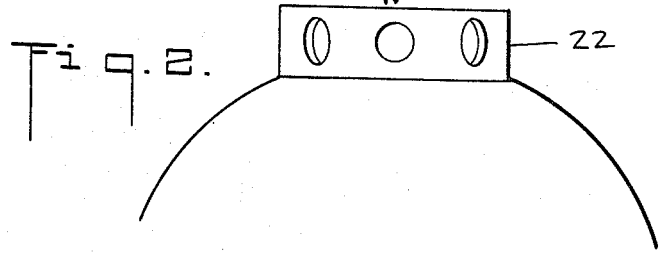

PORTABLE PIPE THAWER

FIELD OF THE INVENTION

This invention relates to an apparatus for thawing frozen pipe, particularly plastic pipe.

The problem in thawing plastic pipe is that the heat should be concentrated on the frozen material itself and the plastic material of the pipe must not be heated to a temperature above the melting point of the plastic.

In reference to all types of pipe, whether plastic or metal, greater efficiency may be achieved by directing to the frozen material itself, rather than dissipating some of the heat on the pipe. Often, the frozen material is located within the pipe at a considerable distance from the pipe opening.

DESCRIPTION OF THE PRIOR ART

Various pipe thawing apparatus are known in the prior art, none of which disclose the same design and provide the same advantages of the present invention. Darley U.S. Pat. 1,361,023 discloses a pipe thawing apparatus which delivers hot water, rather than steam. Spencer U.S. Pat. 246,231 discloses an apparatus for thawing frozen pipes, but the vessel is not a pressure vessel and is designed in a horizontal configuration. Streeper U.S. Pat. 501,744 discloses a device for thawing out frozen pipes which uses apparatus which is considerably more cumbersome and includes a spherical vessel.

Other apparatus known in the art are disclosed in Philippon U.S. Pat. 1,243,973; Ross U.S. Pat. 1,238,826; and Bennett et al U.S. Pat. 930,131.

SUMMARY OF THE INVENTION

This invention relates to an apparatus and method for thawing pipe, particularly plastic pipe. The invention includes a lightweight, portable boiler in which water is converted into steam. The steam is delivered by means of tubing inserted into the pipe to be thawed.

A significant feature of the invention is that the frozen material within the pipe may be heated to a temperature above its melting point without heating the pipe itself to a temperature above the melting point of the material of which the pipe is made. This feature is significant because it allows the invention to be used to thaw pipe made of various plastic materials, as well as metal pipe.

Another important feature of this invention is that the heat, in the form of a pencil-like jet of live steam, is concentrated on the frozen material blocking the pipe, rather than being diffused on the pipe itself.

Thus, it is an object of this invention to provide a device for thawing pipe which is portable and convenient to use. It is a further object of this invention to provide a device which can be used to thaw plastic pipe, as well as metal pipe.

BRIEF DESCRIPTION OF THE DRAWINGS

FIG. 1 is an isometric view of part of the device, not including the source of heat, showing the device in operation with the tubing inserted into a pipe to be thawed.

FIG. 2 is a side view of the device including the source of heat.

FIG. 3 is a horizontal section view of the device taken along the line 3—3 shown in FIG. 2.

DESCRIPTION OF THE PREFERRED EMBODIMENT

The lightweight portable pipe thawer of this invention is designated generally by the numeral 2. Referring to FIG. 1, a liquid such as water is heated inside of a boiler 4 and converted into steam. The boiler 4 is a tank substantially in the form of a closed cylinder capable of withstanding the elevated pressure of steam to be produced therein. The boiler 4 is disposed with the axis of the cylinder in a substantially vertical position. The bottom end portion of the boiler 4 is adapted to transfer heat from a source independent thereof to liquid disposed therein in order to produce steam. This embodiment uses a boiler 4 of approximately one gallon capacity, although other sizes of tank may be used.

The steam under pressure passes from the boiler tank 4 into tubing 6. The outlet end 8 of the tubing 6 is inserted within the pipe to be thawed as far as possible to position the outlet end 8 adjacent to the frozen material in the pipe 10. The live steam is supplied in a pencil-like jet 9 under pressure at the outlet end 8 of the tubing 6.

It has been found that this sharp, pencil-like jet of steam is highly effective in thawing frozen material within the pipe 10 because the steam is concentrated on the frozen material to be thawed rather than being diffused on the pipe 10 itself. Furthermore, the steam, while heating the frozen material to a temperature above its melting point, does not heat the pipe itself to a temperature above the melting point of the material of which the pipe is made. This feature enables this invention to be used to thaw pipe which is made of a plastic material, in addition to pipe made of a metal. If necessary, the tubing 6 may be pushed further and further into the pipe 10 as the frozen material within the pipe 10 is being thawed. This facilitates concentrating the steam on the remaining frozen material within the pipe 10.

The length of tubing 6 may be of any desired length. In this embodiment lengths of tubing which are 25 feet, 50 feet and 75 feet have been used. Tubing 6 made of various materials may be used. This embodiment has been used with tubing 6 made of a flexible plastic material, braided tubing reinforced with cloth or wire and ordinary hose made of rubber. The elongated tube 6 is constructed to withstand the pressure of the steam within the boiler. The tube 6 may be pushed further and further into the pipe 10 as frozen material within the pipe 10 is thawed.

The tubing 6 is attached to boiler 4 by means of a tube connector 12 mounted on the side of the boiler 4. An inlet plug 14 is located on the top of the boiler 4 so that water may be added to the boiler 4. In this embodiment, it has been found that approximately one-half gallon of water should be added to the boiler 4 which is of one gallon capacity. The one-half gallon of water will normally last an hour or more. A water level sight glass 16 is mounted on the side of boiler 4 to indicate the water level within the boiler 4.

A pressure gauge 18 is mounted on the side of boiler 4 to indicate the build up of pressure within the boiler when the water is heated to steam. Referring to FIG. 3, a pressure-sensitive blow-out plug 20 is also mounted on the side of boiler 4. In this embodiment it has been found that the pipe thawer 2 normally operates at about 5 psi (pounds per square inch) of pressure and that pressure gauge 18 seldom registers above 30 psi. In these circumstances, a blow-out plug 20 is used which is designed to blow out at approximately 50 psi. If the hose inserted into the pipe 10 encounters dirt or other blockage, this may cause the pressure in boiler 4 to build up and the pressure gauge 18 wil then warn the user to stop applying heat.

This embodiment is designed to be used with pipe 10 of approximately three-fourths inch to one inch diameter. Other embodiments may be designed for use with pipe of larger diameter. In such case, a greater pressure may be used. Thus, pressures in the range of 200 to 250 psi may be experienced with a blow-out plug of corresponding design.

The tubing 6 used in this embodiment is approximately one-fourth inch to three-fourths inch in outside diameter. The outside diameter of the tubing 6 must necessarily be smaller than the inside diameter of the pipe 10 with which it is to be used in order to allow the tubing 6 to be inserted within the pipe 10. The inside diameter of the tubing 6 may be from one-eighth inch to one-half inch. An inside diameter of three-sixteenths inch is used with this embodiment. Of course, tubing with larger diameters may be used for larger pipe.

Referring to FIG. 2, the source of heat used to convert the water in boiler 4 into steam may be any one of a number of convenient means. In this embodiment a plumber's torch 22 burning propane gas is used as the source of heat. Referring to FIG. 1, the boiler 4 has a flange 5 disposed around the bottom portion of the boiler 4 in a predetermined circumference, adapted to fit upon and receive support from the plumber's torch 22. The plumber's torch 22 may have a round top portion of predetermined circumference adapted for supporting the boiler 4. A blow torch may also be used as a source of heat.

A handle 24 is mounted on the boiler 4 to allow the boiler to be carried conveniently even though it has been heated. The handle 24 is arcuate in shape and is mounted at one end to the side of the boiler 4. The other end of the handle 24 extends in an overlying position relative to the boiler 4.

The utility of this invention is not confined to frozen material within pipe. It may be used to thaw frozen material in other locations. Furthermore, in the foregoing specification, the invention has been described in reference to a specific exemplary embodiment. Variations and modifications, as well as the substitution of equivalent structures and arrangements, may be made without departing from the broader scope and spirit of the invention as set forth in the appended claims. The specifications and drawings are accordingly to be regarded in an illustrative rather than a restrictive sense.

What is claimed is:

1. A lightweight portable device for thawing a pipe by delivering a jet of steam to the interior of the pipe, the device being adapted to be heated by a plumber's torch, the plumber's torch having a burner section with a heating surface extending in a substantially horizontal plane, the heating surface being substantially circular in form, the device comprising:

a. a boiler substantially in the form of a closed circular cylinder capable of withstanding elevated pressure of steam to be produced therein, the elevated pressure being in the range extending upwardly to about 50 pounds per square inch above atmospheric pressure, the boiler being disposed in its operative position with the longitudinal axis of the cylinder being in a substantially vertical position, the bottom of the boiler being flat and circular in form with a predetermined diameter at least equal to that of the heating surface to enable the bottom to overlie and be contiguous with all portions of the heating surface when the boiler is disposed upon the burner section thereby promoting heat transfer therefrom, the boiler having a first opening in the upper portion thereof for enabling liquid to be introduced into the interior of the boiler and means for closing the first opening to contain the liquid and the steam under pressure within the boiler, the boiler further having a second opening in the upper portion thereof for enabling steam under pressure and substantially free of liquid to be discharged from the boiler;

b. an elongated tube connected at one end thereof to the second opening and being constructed to withstand the pressure of the steam within the interior of a pipe to be thawed thereby enabling a length of the tube to extend into the interior frozen portion of the pipe, the other end portion of the tube having an opening which communicates with the interior of the boiler to convey the discharging steam under pressure into the interior of a pipe to be thawed;

c. means connected to the boiler for showing the level of liquid within the boiler;

d. means connected to the boiler for relieving the pressure in the boiler when a predetermined elevated pressure is exceeded;

e. means connected to the boiler for indicating the level of pressure therein, whereby the portable device can be operated at elevated pressure when heated by a plumber's torch; and f. a handle for carrying the device, said handle being arcuate in shape and being mounted at the lower end thereof to the side of the boiler, the upper end of the handle extending substantially horizontally and being spaced apart from the top portion of the boiler, said upper end overlying the top portion adjacent to its intersection with the side of the boiler opposite to which said handle is attached, whereby an operator by grasping the upper end of the handle can carry the device in a substantially upright position.

* * * * *